July 15, 1952 L. J. BARBARA ET AL 2,603,425

TRANSMISSION APPARATUS

Filed May 27, 1947

INVENTORS
LOUIS J. BARBARA
MARVIN M. KLEIN
BERNARD HOWARD
BY William F. Nickel
ATTORNEY Patented July 15, 1952 2,603,425

UNITED STATES PATENT OFFICE 2,603,425

TRANSMISSION APPARATUS

Louis J. Barbara, Woodside, Marvin M. Klein, Jackson Heights, N. Y., and Bernard Howard, North Arlington, N. J.

Application May 27, 1947, Serial No. 750,746

1 Claim. (Cl. 242—54)

This invention is an improvement in transmission apparatus, and especially gearing for turning the reels for the wire of a magnetic recorder and reproducer at the proper speed to maintain uniform tension on the wire under constantly changing operating conditions.

An important object of the invention is to provide gearing of simple and efficient design that will rotate a transmission member in such apparatus at a predetermined uniform speed, with said member connected to both reels and at the same time under control to cause the wire to move at equal peripheral speed on both reels as it leaves either reel and is wound up on the other.

Our invention is especially adapted for magnetic recording and reproducing devices of the kind set forth in our copending application, Serial No. 688,354, filed August 3, 1946. That apparatus comprises a pair of reels and a length of magnetic wire which is drawn from one reel and taken up upon the other, with members for so controlling the reels that the peripheral or linear speed of the wire is always the same on both reels, to avoid excessive tension on the wire and damage thereto or breaking thereof. When the wire is drawn from one reel to the other for the recording action, a relatively low speed is desirable. When, however, the wire is rewound upon the first reel and moved in the reverse direction, preparatory to reproducing the record, a higher speed is convenient. This invention provides connections whereby the reels can be turned in this way from a motor, which is coupled to rotate the reels in the manner set forth, but the reels are engaged by a common operating element which is automatically shifted to adjust the relative speeds of the two reels to regulate the tension in the manner which our aforesaid application fully sets forth.

The drawings show a preferred form of the invention, but of course variations in the structure shown may be adopted so far as is consistent with the meanings of the terms in which the claim is expressed; and without deviating from the principle of the invention.

Figures 1, 2, 3:
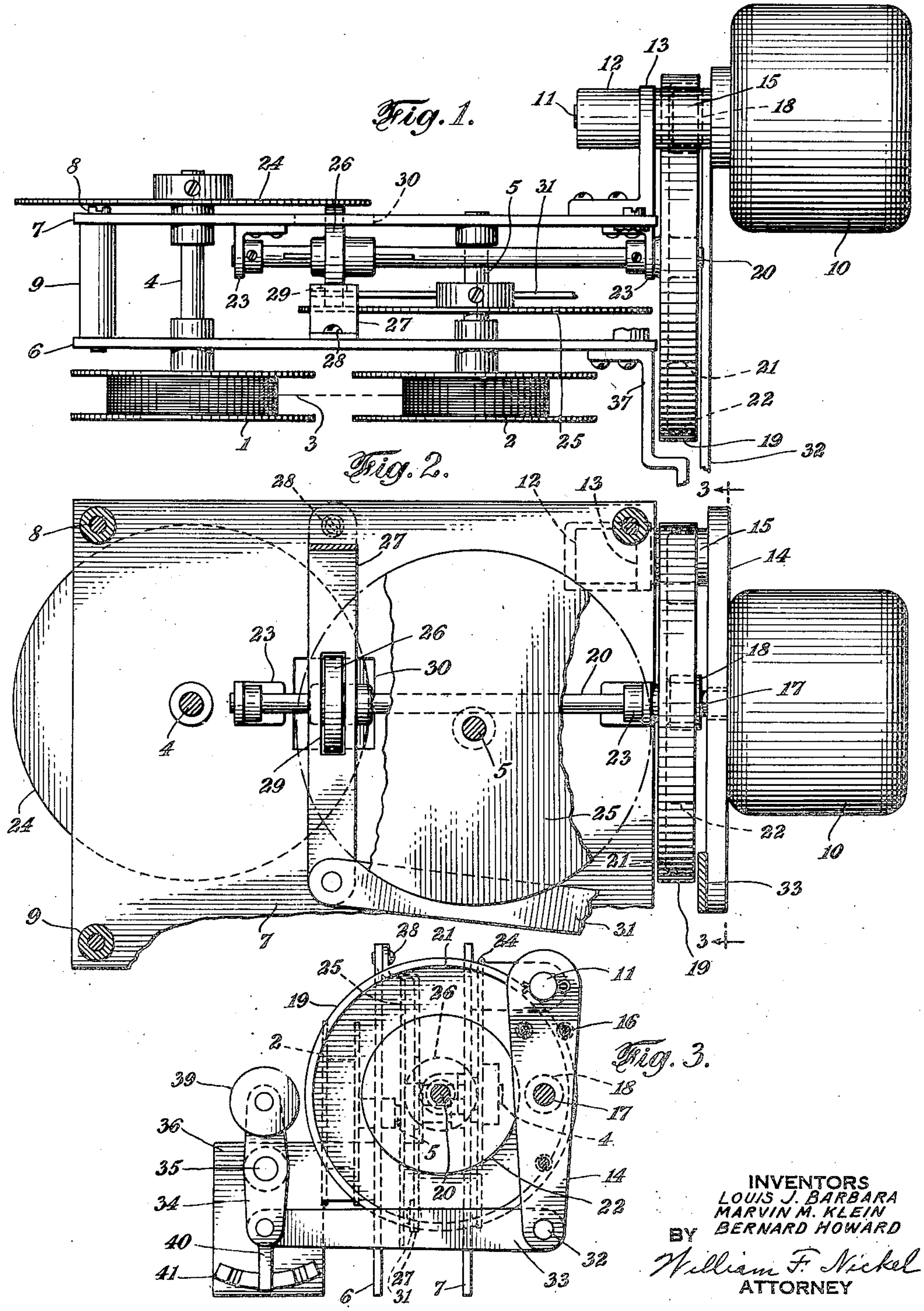
Figure 1 shows a top plan of gearing according to this invention, for a magnetic recording and reproducing apparatus.
Figure 2 shows a side view thereof.
Figure 3 is an end of same.

The recording and reproducing apparatus above referred to comprises a reel 1 and a reel 2, and the wire that is used for recording and reproducing is indicated at 3, partly wound on both reels and running from the one to the other over a controlling arrangement fully set forth in our aforesaid application but not shown herein. The reel 1 is mounted on a shaft 4, and the reel 2 on a shaft 5, these two shafts being supported in bearings in a framework comprising a front plate 6 and a back plate 7, connected by bolts, one of which is shown at 8, and each surrounded by a spacing sleeve 9 to hold the front and back at a fixed distance apart. The reels are rotated by a motor unit 10, which is suspended from a horizontal journal 11, mounted in the bearing 12 on the bracket 13, secured to the back 7 of the frame. One end of this journal projects from the bearing 12, and supports a depending arm 14, having a hub 15, which receives the projecting end of the journal 11 and is secured thereon by a cotter pin passing through the adjacent extremity of the journal 11, or by other means. This arm is affixed to the outer casing of the motor by screws 16. The motor can therefore be swung from side to side on the journal 11 as on a pivot.

The arm attached to the hub 14 extends downward, and the shaft 17 of the motor passes through it and carries a friction wheel 18. The latter engages and drives a grooved disk or friction gear 19 fixed to one end of a shaft 20 on the framework of the apparatus. This friction gear 19 has a hub 21, and a rim 22 separated from the hub by an annular groove, which is slightly wider than the diameter of the gear 18. Hence if the motor is swung to bring the gear 18 into engagement with the hub 20, the reels will be rotated faster, and if this gear makes contact with the inside of the rim 21, the reels will be revolved more slowly. The shaft 20 is mounted in bearings 23 on the inner face of the rear plate 7.

In our application aforesaid, we have shown connections by which, when the motor drives the reel 1 on the shaft 4, motion is transmitted through other connections to the shaft 5 of the reel 2, these connections being self adjusting so that as the reel 2 fills with wire and the reel is emptied, the relative speeds of the shafts 4 and 5 are constantly changed to keep the linear speed of the wire equal on both reels. Said connections include a disk 24 fixed on the shaft 4 of the reel 1, and a similar disk 25 fixed on the shaft 5 of the reel 2; these reels overlapping each other. On the shaft 20 is an operating element or friction gear 26 which engages both disks on their opposed faces, said gear being slidable along the shaft or driving member 20, but keyed thereto. As the shaft 20 is rotated by the motor 10, the friction gear 26 revolves both disks 24 and 25; to unwind the wire 3 from one reel to the other and as the wheel 26 is shifted in an axial direction, as set forth in our earlier application aforesaid, the relative speeds of the two disks and the two reels is altered.

Our above-mentioned application describes means which is effective both when the wire is drawn from the reel 1 and transferred to the reel 2, and when it is rewound on the reel 1, for shifting the friction wheel 26 in the direction of its own axis, so that the peripheral speed of the wire is the same on the two reels. Thus the wire is never subjected to destructive or even dangerous tensile stresses. Part of such means is indicated in Figures 1 and 3 in the form of an arm 27, one end of which is pivotally secured at 28 to the inner face of the front plate 6. The middle part of the arm 27 has a slot 29 which receives the rim of the wheel 26. The disk 25 is placed just behind the front plate 6 and the other disk is behind the rear plate 7, but this plate has a recess 30 so that the wheel 26, to make contact with the disk 24 can project through the plate 7. The end of the arm 27 opposite the pivot 28 is pinned to a link 31 which actuates the arm 27 to move the wheel 26 in either direction along the shaft 20. This link is illustrated in our aforesaid application as coupled to parts that are controlled by the wire 2 between the two reels, and responsive to instantaneous changes in tension thereon, so that said parts will move said link and automatically adjust the position of the friction wheel 26 to cause the disks 24 and 25 and the reels 1 and 2 to revolve at the speeds required. The parts in question can be manipulated and set to give this action both when the wire travels from the reel 1 to the reel 2, and when the reels are revolved to move the wire in the reverse direction.

The apparatus of our aforesaid application, however, shows the motor 10 connected to shaft 4 of the reel 1, so that the disk on the shaft 4 acts through the friction wheel to turn the other disk on the shaft 5 of the reel 2; and this friction wheel, as above stated is always being slowly shifted to change the gear ratio of the two disks 24 and 25. Of course any type of reduction gearing, if needed, can be utilized with the motor 10, but the latter is a constant speed unit; therefore the speed of the shaft 4, as long as it is so connected to the motor, will also be constant. That is, while the angular speed of the reel 1 will not change, the peripheral speed of the wire thereon of course varies with the thickness or depth of the layers of wire thereon. If the reel 1 is filled with the wire, the speed of the wire leaving this reel will be relatively great at first, and then lower and lower as the layer of wire becomes thinner; and conversely when the reel turns the other way to draw back the wire upon it; and the layer becomes thicker. This condition makes the regulating operation of the wheel 26 somewhat difficult, because it can only influence the disk on the shaft 5 of the wheel 2.

This objection is entirely obviated by mounting the friction wheel 26 on the shaft 20 and connecting the latter shaft, instead of the shaft 4, direct to the motor 10. The rotation of this wheel 26 directly from the motor 10 enables it to regulate both reels, and thus work to much better advantage for the purpose of keeping the peripheral speeds of the wire 2 at all times equal on the two reels and holding the tension thereon within safe limits.

At the lower end the arm 14 is connected by a pin 32 to a link pin 33 running to an adjusting arm 34, which is pivoted at 35 on a plate 36 secured to a bracket 37 on the outer face of the plate 6, and carrying at one end a knob 39.

At the opposite end is an extension 40, which engages a rack 41. This rack has three recesses in its edge, and when the projection 40 engages the middle recess, the gear 18 is held in neutral position out of contact with either the hub 22 or the rim 21 of the grooved wheel 19. When the knob 39 is pulled to throw the arm 34 so that the projection 40 slips into either one of the side recesses, the motor is swung by the arm 14 so that the wheel 18 on the shaft thereof engages either the hub 22 of the wheel 19 or the rim 21 of the latter. Hence when recording is being accomplished, the motor can be made to drive the reels through the rim 21 of the wheel 19 at the relatively low speed required by this operation. After the recording is finished and the wire is to be retracted and wound back on the reel 1, to be drawn off again and rewound upon the reel 2 for reproducing, the rewinding of the wire from the reel 2 on the reel 1 can be done much more quickly because the motor is then swung to make the wheel 18 engage the hub 22 of the wheel 19, and the apparatus is put in position for reporducing in a much shorter time.

This mechanical design is well calculated to serve all the purposes of our invention. It is of simple construction and very certain and safe in operation, giving the required change of speed without any additional gear elements. The same motor and gear 18 is used for both speeds, and to accomplish this the engagement of the gear wheels 18 to 19 is merely adjusted as above described.

Having described our invention, what we believe to be new is:

Transmission apparatus comprising a pair of reels, a disk rigid with each reel, a rotatable shaft between said disks, a friction wheel keyed on the shaft but mounted to slide along same, the disks overlapping and said wheel engaging the opposed faces thereof, connections for adjusting said wheel along the shaft and means for revolving the shaft, said connections comprising a lever between said disks and having a fixed pivot at one end and movable at the opposite end, said lever having a longitudinal slot between its ends receiving the wheel, so that the wheel is shifted by the movement of the lever, said means comprising a friction gear on said shaft, said gear having a circular groove in one face, a motor having a shaft with a friction wheel thereon, and a shiftable arm carrying the motor to cause said wheel to engage either side of said groove.

LOUIS J. BARBARA.
MARVIN M. KLEIN.
BERNARD HOWARD.

REFERENCES CITED

The following references are of record in the file of this patent:

UNITED STATES PATENTS

| Number | Name | Date |
|---|---|---|
| 771,861 | Curtiss | Oct. 11, 1904 |
| 1,346,357 | Wenderhold | July 13, 1920 |
| 1,414,941 | Gill | May 2, 1922 |
| 1,981,370 | Mowat | Nov. 20, 1934 |
| 2,304,971 | Tuttle et al. | Dec. 15, 1942 |
| 2,322,014 | Grant | June 15, 1943 |